United States Patent [19]

Heinz

[11] 3,728,697

[45] Apr. 17, 1973

[54] BUBBLE DOMAIN SYSTEM

[75] Inventor: David M. Heinz, Orange, Calif.

[73] Assignee: North American Rockwell Corporation, El Segundo, Calif.

[22] Filed: Dec. 21, 1970

[21] Appl. No.: 99,937

[52] U.S. Cl. ....................... 340/174 TF, 340/174 QA

[51] Int. Cl. ............................................ G11c 11/14

[58] Field of Search ................. 340/174 TF; 317/235, 317/48.9; 148/1.5

[56] References Cited

UNITED STATES PATENTS

| | | | |
|---|---|---|---|
| 3,643,238 | 2/1972 | Bobeck et al. | 340/174 TF |
| 3,526,883 | 9/1970 | Tabor | 340/174 TF |
| 3,585,614 | 6/1971 | Tabor | 340/174 TF |

*Primary Examiner*—James W. Moffitt

*Attorney*—L. Lee Humphries, H. Fredrick Hamann and Joseph E. Kieninger

[57] ABSTRACT

A bubble domain system of magnetic material having a portion containing small diameter bubble domains and an adjacent portion having larger diameter bubble domains. A method for forming large diameter bubble domains in a magnetic material containing small diameter bubble domains is also included.

7 Claims, 3 Drawing Figures

INVENTOR
DAVID M. HEINZ
BY
Joseph E. Kieninger
ATTORNEY

BUBBLE DOMAIN SYSTEM

BACKGROUND OF THE INVENTION

1. Field of the Invention

This invention relates to bubble domain systems and more particularly to a bubble domain system having bubble domains of at least two different diameter sizes.

2. Description of Prior Art

Early work in bubble domain research such as that described in the U.S. Pat. No. 3,460,116 by Bobeck et al. was done primarily with orthoferrites having a bubble domain diameter of about 0.0015 inch. The relatively large diameter of these bubble domains permitted their generation and detection to be performed by means that are now well established in the literature. More recent work has shown the feasibility of using iron garnets for bubble domain devices. Bubble domain structures having an iron garnet film, $J_3Q_5O_{12}$, where J is a rare earth element or yttrium and Q contains iron, are described in the copending applications Ser. Nos. 16,446 and 16,447 filed Mar. 4, 1970; Ser. Nos. 101,786, 101,785 and 101,787, filed Dec. 28, 1970 which are incorporated herewith. The bubble domains in iron garnets have a smaller diameter than those in orthoferrites, thereby providing a bubble domain density in iron garnets of over a million per square inch. The diameter of the bubble domains in these iron garnets is about 0.00025 inch. The small size of the iron garnet bubble domains makes it difficult to generate and detect the bubble domains in bubble domain systems.

In particular, current-loop bubble-splitters presently available to generate bubble domains having a diameter size of 0.0015 inch cannot be satisfactorily used to generate small bubble domains having a diameter size of 0.00025 inch because of the limits imposed by photolithographic resolution and the thickness of the conductor required to carry the current. Also, the output signal from a Hall effect device used for bubble detection is dependent on the area exposed to reverse-magnetized domains. As a result, bubble domains having a small diameter have a corresponding small area that produces a small detection signal which makes detection of the small bubble domain difficult.

SUMMARY OF THE INVENTION

There is described a bubble domain system having one portion containing bubble domains of a small diameter and a second portion containing bubble domains having a larger diameter. For example, a bubble domain system has a first portion of magnetic material in which relatively large bubbles may be generated. A second portion of magnetic material associated with the first portion has small bubble domains therein. In some embodiments, a third portion of magnetic material associated with the second portion has large diameter bubble domains to facilitate the detection thereof.

IN THE DRAWINGS

DETAILED DESCRIPTION OF AN ILLUSTRATIVE EMBODIMENT

Figure 2:
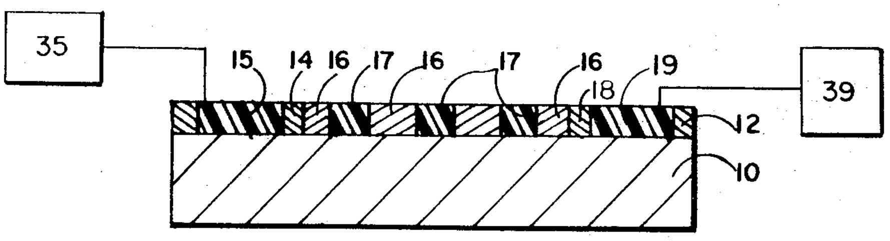
FIG. 2 is a cross-sectional view of FIG. 1.

As shown in FIG. 2, a monocrystalline substrate 10 has a thin film of magnetic bubble domain material 12 thereon.

The substrate 10 is a monocrystalline material having a $J_3Q_5O_{12}$ formulation wherein the J constituent of the wafer formulation is at least one element selected from the group consisting of cerium, praseodymium, neodymium, promethium, samarium, europium, gadolinium, terbium, dysprosium, holmium, erbium, thulium, ytterbium, lutetium, lanthanum, yttrium, calcium, bismuth; and the Q constituent of the wafer formulation is at least one element selected from the group consisting of indium, gallium, scandium, titanium, vanadium, chromium, manganese, rhodium, zirconium, hafnium, niobium, tantalum, and aluminum.

Examples of preferred substrate materials are $Gd_3Ga_5O_{12}$, $Gd_{2.7}Y_{0.3}Ga_5O_{12}$.

The film of bubble domain material is a film having a $J_3Q_5O_{12}$ formulation wherein the J constituent of the film formulation has at least one element selected from the group of cerium, praseodymium, neodymium, promethium, samarium, europium, gadolinium, terbium, dysprosium, holmium, erbium, thulium, ytterbium, lutetium, lanthanum and yttrium; the Q constituent of the film formulation is taken from the group consisting of iron, iron and aluminum, iron and gallium, iron and indium, iron and scandium, iron and titanium, iron and vanadium, iron and chromium, and iron and manganese.

Examples of preferred film materials are $Y_3Ga_{1.2}Fe_{3.8}O_{12}$ and $Y_3Ga_{1.1}Fe_{3.9}O_{12}$.

A preferred composite film-substrate structure has an iron garnet film with a given magnetostriction constant and a given difference between the lattice constants of the film and substrate. This requirement is discussed in detail in the copending patent applications Ser. Nos. 101,786, 101,785 and 101,787, filed Dec. 28, 1970 by Mee et al. which are incorporated herewith by reference thereto.

Figure 1:
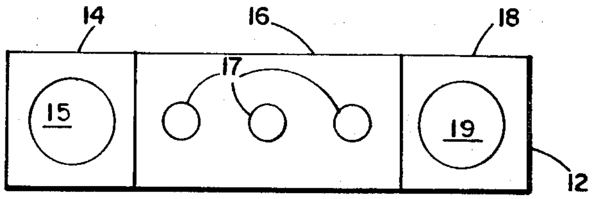
FIG. 1 is a top view of a bubble domain containing structure in accordance with this invention.

The magnetic film layer 12, as shown in FIG. 2 and in the FIG. 1 top view, has a portion 14 containing a bubble domain 15, a portion 16 containing bubble domains 17 therein, and a portion 18 containing a bubble domain 19 therein. The portion 14 is bubble domain material having a magnetization of a first level. An example of portion 14 would be gallium substituted yttrium iron garnet. The diameter of the bubble domain 15 in the gallium substituted yttrium iron garnet would be about 0.00050 inch, which is relatively large.

The portion 16 is a bubble domain material having a higher level of magnetization than portion 14 so that the bubble domains 17 have a smaller diameter than bubble domains 15. An example of a suitable material for portion 16 would be gallium substituted yttrium iron garnet having a bubble domain diameter of about 0.00025 inch.

Portion 18 would be a bubble domain material similar to that of 14, that is, one having a relatively large bubble domain diameter, for example gallium substituted yttrium iron garnet. As shown in FIG. 2, a generator 39 is associated with portion 18 for the purpose of generating bubble domains such as bubble domain 19. A detector 35 is associated with portion 14 for the purpose of detecting bubble domains such as bubble domain 15. The generator 39 and the detector 35 are well known devices described extensively in the literature.

There are several methods which may be employed to form the bubble domain system in accordance with this invention. One method of forming the structure shown in FIG. 1 would be to deposit a uniform layer of magnetic material 12 over the entire substrate surface so that the original portions 14, 16 and 18 all have the same magnetization level and all have relatively small diameter bubble domains. Then the magnetization level of portions 14 and 18 are lowered by diffusing into these portions with suitable ions such as aluminum, gallium and the like to provide a material having relatively large diameter bubble domains. It is preferred that the diffusion be made with an ion having a valence of +3 so that the ion diffused would substitute for the iron. It is understood, of course, that the portion 16 would be masked during the diffusing step.

Another method of altering the magnetization level of portions 14 and/or 18 would be by ion implantation methods which are well known in the semiconductor industry.

Figure 3:
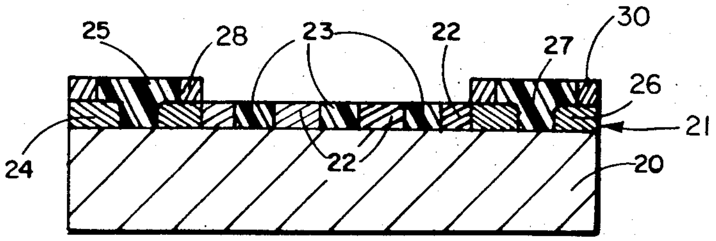
FIG. 3 is a cross-sectional side view of an alternate embodiment of this invention.

A preferred method of forming the bubble domain system of this invention is shown in FIG. 3. This process is described in detail in copending patent application to Heinz, Ser. No. 100,230, filed Dec. 21, 1970. A substrate 20 of the type described previously is subjected to a chemical vapor deposition step to form a layer 21 thereon of a magnetic film such as $Y_3Ga_{1.2}Fe_{3.8}O_{12}$. Layer 21 is of uniform composition and has portions 22, 24 and 26. An appropriate masking layer is placed over the portion 22. By a chemical vapor deposition process, layers 28 and 30 of a single crystal magnetic material having a greater concentration of a non-magnetic element such as gallium is deposited on top of portions 24 and 26, respectively. An example of such a material for layer 28 and layer 30 is $Y_3Ga_{1.3}Fe_{3.7}O_{12}$. The resultant magnetization level would be lower and the bubble diameter would be larger in portions 28 and 30 than in portion 22. The bubble domain in these composite portions extends through both layers. For example, bubble domain 25 is in composite layer 24–28 and bubble domain 27 is in composite layer 26–30. The bubble domains 25 and 27 in the composite layers have a larger diameter at the surfaces 28 and 30 than the bubble domains 23 in portion 22.

I claim:

1. In a bubble domain system, the combination of
   a first portion of magnetic bubble domain material having a magnetization of a first level determined by the properties of the material wherein bubble domains having a first minimum diameter are permitted and
   a second portion of magnetic bubble domain material adjacent to said first portion, said second portion having a level of magnetization determined by the properties of the material different than said first portion wherein bubble domains having a second minimum diameter are permitted.

2. A combination as described in claim 1 including a third portion of magnetic bubble domain material adjacent to said second portion, said third portion having a magnetization level different from said second portion and similar to the magnetization level of said first portion wherein bubble domains having said first diameter are permitted.

3. A bubble domain system as recited in claim 1 including generator means associated with said first portion.

4. A bubble domain system as recited in claim 1 including detector means associated with said first portion.

5. In a bubble domain system, the combination of
   a first portion of bubble domain material having a first level of magnetization,
   a generator associated with said first portion suitable for generating a bubble domain in said first portion,
   a second portion of bubble domain material associated with said first portion, said second portion having a magnetization level higher than said first portion,
   a third portion of bubble domain material associated with said second portion, said third portion having a magnetization level lower than said second portion, and
   a detector associated with said third portion suitable for detecting a bubble domain in said third portion.

6. A bubble domain structure comprising
   a single crystal substrate,
   a film of single crystal magnetic material, said film having a first portion and a second portion, said first portion having a magnetization of a first level, and said second portion having a level of magnetization different than said first portion, said magnetization levels defining magnetic properties wherein bubble domains of different minimum diameters are established therein.

7. A method of forming a bubble domain system comprising the steps of
   forming a layer of single crystal magnetic material on a suitable substrate such that a first portion thereof has a magnetization characteristic of a first level and a second portion thereof has a magnetization characteristic of a second level different from said first portion.

* * * * *

PO-1050
(5/69)

UNITED STATES PATENT OFFICE
CERTIFICATE OF CORRECTION

Patent No. 3,728,697 Dated April 17, 1973

Inventor(s) David M. Heinz

It is certified that error appears in the above-identified patent and that said Letters Patent are hereby corrected as shown below:

Column 2, line 20, insert --and $Y_3Al_5O_{12}$-- before the period.

Signed and sealed this 1st day of January 1974.

(SEAL)
Attest:

EDWARD M.FLETCHER,JR.
Attesting Officer

RENE D. TEGTMEYER
Acting Commissioner of Patents